United States Patent [19]

Raehse et al.

[11] Patent Number: 4,507,474

[45] Date of Patent: Mar. 26, 1985

[54] PROCESS FOR HIGHLY SUBSTITUTED CARBOXYALKYL CELLULOSES AND MIXED ETHERS THEREOF

[75] Inventors: Wilfried Raehse, Duesseldorf; Norbert Kuehne, Haan; Willi Wuest, Ratingen; Konrad Engelskirchen, Meerbusch, all of Fed. Rep. of Germany

[73] Assignee: Henkel Kommanditgesellschaft, Duesseldorf, Fed. Rep. of Germany

[21] Appl. No.: 573,164

[22] Filed: Jan. 24, 1984

[30] Foreign Application Priority Data

Jan. 31, 1983 [DE] Fed. Rep. of Germany ....... 3303153

[51] Int. Cl.$^3$ .................... C08B 11/193; C08B 11/00
[52] U.S. Cl. ........................................ 536/97; 536/90; 536/91; 536/98
[58] Field of Search ............... 536/91, 97, 98, 90

[56] References Cited

U.S. PATENT DOCUMENTS

| | | | |
|---|---|---|---|
| 3,085,087 | 4/1963 | Henry et al. | 536/97 |
| 3,088,943 | 5/1963 | Cordrey et al. | 536/98 |
| 3,251,825 | 5/1966 | Haidasch et al. | 536/91 |
| 4,306,061 | 12/1981 | Majewicz | 536/98 |
| 4,310,663 | 1/1982 | Hilbig et al. | 536/91 |
| 4,311,833 | 1/1982 | Namikoshi et al. | 536/98 |

FOREIGN PATENT DOCUMENTS

| | | | |
|---|---|---|---|
| 0074631 | 3/1983 | European Pat. Off. | 536/98 |
| 2372177 | 7/1978 | France | 536/91 |
| 1253726 | 11/1971 | United Kingdom | 536/91 |

OTHER PUBLICATIONS

Bull. Soc. Chim. France, 1960, 1750–1754.
Chemical Abstracts, 52, (1958), 19501 a.

*Primary Examiner*—Ronald W. Griffin
*Attorney, Agent, or Firm*—Ernest G. Szoke; Henry E. Millson, Jr.; Mark A. Greenfield

[57] ABSTRACT

A process for the production of carboxyalkyl celluloses having an average degree of substitution of at least 1.0. The process comprises up to 3 stages, but without any intermediate purification. The preferred suspension medium is isopropanol. In each stage of the process, the carboxyalkylating agent is used in quantities of less than 2.5 moles per mole of anhydroglucose unit and the alkylating agent in quantities of less than 5 moles per mole of anhydroglucose unit. The total water content of the system throughout the reaction as a whole must not exceed 450% by weight, based on the quantity by weight of cellulose used. Water contents of from 80 to 250% by weight are preferred.

22 Claims, No Drawings

PROCESS FOR HIGHLY SUBSTITUTED CARBOXYALKYL CELLULOSES AND MIXED ETHERS THEREOF

This invention relates to a simplified and economical process for the production of highly substituted carboxyalkyl celluloses, particularly carboxymethyl celluloses, and mixed ethers thereof. In the context of the invention, highly substituted carboxyalkyl celluloses are understood to include any products of which the average degree of substitution (DS) amounts to at least 1.0 and, preferably, is greater than 1.5 and, more preferably, greater than 1.7. Since the anhydroglucose unit to be etherified contains 3 etherifiable OH-groups, the maximum DS for carboxyalkyl groups is 3, although this theoretical limit can hardly be reached in an economically acceptable process. Accordingly, the present invention relates in particular to the production of carboxyalkyl celluloses and, if desired, mixed ethers thereof with other known etherifying agents which, with respect to the carboxyalkyl substitution, have DS-values of from 1.0 to 2.8 and, more particularly, from 1.5 to 2.6.

BACKGROUND OF THE INVENTION

Highly substituted carboxyalkyl celluloses of the type described above have been described only comparatively rarely in the literature. Degrees of substitution of greater than 1.5 have only been obtained by multiple reactions on a laboratory scale in basic research. For a degree of substitution of at most 2.6, M, Bouttemy (Bull. Soc. Chim. France 1960, 1750–4) required, per mole of cellulose, from 75 to 170 moles of monochloroacetic acid which were added in approximately 10 successive etherification reactions. The selectivity levels obtained amounted to only 3.5% and 1.5%.

The production of carboxymethyl celluloses or their sodium salts with DS-values of from 1.5 to 2.0 in a multistage process, which is said to have advantages over a single-stage process, is reported in Chemical Abstracts 52 (1958) 15901 a. In this process, a very small quantity of chloroacetic acid (approximately 0.8 mole per glucose unit) has to be used in each individual stage and the crude product of each stage isolated and carefully purified before it is delivered to the next etherification stage.

None of these hitherto proposed methods for adjusting high degrees of substitution can be carried out economically on an industrial scale. They are the outcome of basic laboratory research work in which the quantities used, the reaction conditions and the reaction times are not crucial factors.

DESCRIPTION OF THE INVENTION

By contrast, the object of the present invention is to provide an industrially workable, economical process for the production of the above-mentioned highly substituted carboxyalkyl celluloses and, if desired, mixed ethers thereof with other known etherifying agents. The process of the invention is intended to enable carboxyalkyl celluloses and mixed ethers thereof having a high carboxyalkyl-DS and a variable, mean overall degree of substitution (MS) of the ether groups to be obtained by a procedure which, although again involving several stages, is carried out so that the products obtained represent a valuable addition to the marketplace, particularly from the point of view of price.

Accordingly, the present invention relates to a process for the production of highly substituted carboxyalkyl celluloses having an average degree of substitution (DS) of from about 1.0 to about 2.8, preferably from about 1.8 to about 2.6, and more preferably from about 2.0 to about 2.5, and, optionally, mixed ethers thereof having a mean overall degree of substitution (MS) of greater than 1 (carboxyalkyl groups and other ether groups) in reaction stages repeated several times, with each stage comprising alkalizing a suspension of finely divided cellulose in an organic solvent and subsequent etherification with the carboxyalkylating agent, if desired accompanied, preceded or followed by reaction with other etherifying agents. The process of the invention has no more than 3 reaction stages, in each of which the carboxyalkylating agent is used in a quantity of no more than 2.5 moles per mole of anhydroglucose unit and the alkalizing agent is used in a quantity of no more than 5 moles per mole of anhydroglucose unit. Following the first reaction stage, the second reaction stage (and the third if used) is carried out on the reaction mixture of the previously completed reaction stage without intermediate purification of the reaction product. The total water content of the system before the last etherification stage amounts to no more than about 450% by weight, based on the quantity by weight of cellulose used. The total water content of the reaction system before the last etherification stage preferably amounts to no more than 350% by weight and, more particularly, is between about 80 and about 250% by weight, based in each case on the quantity by weight of cellulose used.

The process of the invention, which is suitable for economic use on an industrial scale, combines a number of cost-saving and energy-saving features.

The multistage reaction is limited to at most 3 reaction stages. In fact, 3 reaction stages are only necessary where extremely high DS-values are required; satisfactory results generally being obtainable with 2 reaction stages. The quantity of the carboxyalkylating agent used per process stage is also numerically limited in such a way that losses of reactants through undesirable secondary reactions are kept to a reasonable level. Commensurate with this quantitative limitation of the carboxyalkylating agent, the quantity of alkalizing agent used per process stage is also limited. The reaction product is intentionally not purified between the individual process stages. Instead, the following process stage, comprising alkalization and subsequent etherification, is carried out on the reaction mixture of the preceding, completed reaction stage, Finally, the process of the invention provides in particular or the course of the reaction to be displaced in the required direction by control of the overall water content of the system. Other measures, which are described in detail in the following disclosure, ensure that, over the process as a whole including before the final etherification stage, the water content of the reaction system does not exceed a limited upper threshold value. All these measures contribute to the economical production of highly substituted carboxyalkyl celluloses.

For further economic development of the new process, it is generally preferred to carry out the alkalization step of a following reaction stage with only limited cooling of the reaction mixture from the preceding process stage. Normally, the alkalization of cellulose is carried out at comparatively low temperatures and the subsequent etherification step at a higher temperature.

According to the invention, this temperature pattern is generally used in the first alkalization and etherification stage of the overall process. In this embodiment, however, alkalization in the following reaction stages 2 and optionally 3 can be carried out with only minimally influencing the temperature, i.e. with only limited cooling of the reaction product from the first and, if applicable, second etherification stage. Alkalization and etherification are normally carried out at temperatures in the range of from about 10 to about 110° C. and preferably at temperatures in the range of from about 30 to about 85° C., except that in the first stage of the process alkalization is preferably carried out at temperatures in the range of from about 10 to about 30° C. Where the temperature used is above the boiling point of the system, the reaction is carried out under pressure, for example, by carrying out the process in an autoclave.

A crucial factor in the process of the invention is that the molar ratio of carboxyalkylating agent to anhydroglucose unit should not exceed a certain value in any stage of the process. The upper limit to this molar ratio per process stage is at about 2.5 moles of the carboxyalkylating agent per mole of anhydroglucose unit. It is preferred to use smaller quantities of carboxyalkylating agent which normally do not exceed a limit of approximately 2.2 moles per mole of anhydroglucose unit. The carboxyalkylating agent is preferably used in a quantity of from about 1.0 to about 2.2 moles per mole of anhydroglucose unit in each etherification stage. Larger quantities of etherifying agent merely enter into undesirable secondary reactions and therefore do not accomplish the objectives of the invention as well as providing additional contaminants.

Commensurate with the limitation of the quantity of carboxyalkylating agent used per process stage, the quantity of alkalizing agent used per reaction stage is also limited. The upper limit to the quantity of alkalizing agent used per process stage is preferably at about 4.5 moles per mole of anhydroglucose unit, the alkalizing agent more preferably being used in quantities of from about 2 to about 4 moles per mole of anhydroglucose unit per process stage.

The required displacement of the present reaction toward high degrees of substitution is made possible in particular by controlling the total amount of water in the system. In this connection, it is important to keep the water content of the reaction system sufficiently low in all stages of the process. However, no clearly soluble products can be obtained without some addition of water. The lower the required degree of substitution is intended to be, the higher the level to which the water content of the cellulose is adjusted. Conversely, the lower the total water content of the system, the higher can be the desired degree of substitution of the carboxyalkyl cellulose.

The quantity of water in the system and hence the degree of substitution can be influenced in various ways:

On the one hand, the quantity of water introduced into the system through the reactants and the reaction auxiliaries is important. Another factor to be taken into consideration is the quantity of water that is formed during the reaction, which must be taken into account together with the permissible quantity of water introduced through the reactants and reaction auxiliaries. Finally, it is possible in accordance with the invention to remove undesirably large quantities of water from the reaction mixture between stages, in particular by azeotropic distillation with the suspension liquids used, and in this way to reduce the water content of the system.

In fact, the number of stages required to carry out the process of the invention can also be influenced through the water content. Whereas, for example, medium degrees of substitution DS of from 1.0 to 1.5 can be obtained in one process stage by using reactants and reaction auxiliaries containing little or no water, it is on the other hand possible to obtain the same degrees of substitution with limited quantities of water present in the reaction mixture, although in that case the process has to be carried out in two stages. So far as the objective of the invention, i.e. the economical production of the above-described carboxyalkyl celluloses, is concerned, the two-stage procedure may ultimately be less expensive and simpler than working in the virtual absence of water. Thus, it may be particularly desirable and beneficial to the process to use aqueous sodium hydroxide, for example, to facilitate alkalization and to circulate a water-containing alcohol azeotrope as the liquid suspending agent. For extremely high degrees of carboxyalkyl substitution (DS), i.e. >1.5, the reaction has to be carried out twice or even three times with strict limitation of the total water content in each process stage. According to the invention, this is done by suspending the cellulose starting material in pure solvent (100%), alkalizing the resulting suspension with concentrated alkali hydroxide (particularly 50 to 100% sodium hydroxide, in which case 0 to 50% may be water and/or methanol) and etherifying the product with an anhydrous carboxyalkylating agent. The solid carboxyalkylating agent used can be dissolved in the anhydrous or substantially anhydrous solvent (suspending agent). By controlling the total water content in the system through the individual process stages and also by limiting the starting molar ratio within the limits according to the invention, it is possible to produce carboxyalkyl celluloses having high degrees of substitution, more particularly in the range of from about 1.1 to about 2.6, in two to at most three reactions. In virtually every case, the selectivity levels range from 40 to 80%, i.e. are situated within economically favorable ranges.

Another possibility for steering the process of the invention toward the required objective is to coordinate the quantities of etherifying agent and alkalizing agent used in the individual stages of the process as a whole. The quantity of etherifying agent used in a following reaction stage is preferably at most equal to the corresponding quantity of etherifying agent from the preceding reaction stage. However, it is particularly preferred to use less etherifying agent in the following reaction stage than in the immediately preceding reaction stage. Accordingly, it is likewise preferred that the quantity of alkalizing agent used in each following reaction stage be at most equal to the quantity of alkalizing agent used in the preceding stage and particularly preferred that the quantity of alkalizing agent used in the following reaction stage be correspondingly smaller than the quantity of alkalizing agent used in the preceding stage.

The preferred carboxyalkylating agents are haloacetic acids such as monochloro- or monobromopropionic acid, or more preferably, monochloroacetic acid, which can be used as such or in the form of their alkali metal, e.g. sodium salts. Their use in the form of their sodium salts further limits the total water content of the reaction system and, accordingly, may be desirable. Where the carboxyalkylating agent is used in salt form, the amount of alkali required in the alkalization stage is reduced in known manner by this amount which would otherwise be used for in situ salt formation. The preferred alkalizing agent is sodium hydroxide although other alkali metal hydroxides such as potassium hydroxide can also be employed.

The preferred liquid suspending agents for the cellulose are lower aliphatic alcohols, particularly those containing up to 6 carbon atoms, and preferably those containing from 2 to 5 carbon atoms. Accordingly, particularly suitable liquid suspending agents are ethanol, n-propanol, and especially isopropanol and n-butanol. Other suitable liquid suspending agents include isobutanol, tert.-butanol, n-amyl alcohol and other organic suspending liquids, for example acetone, and mixtures of the above-mentioned suspending agents. Other suspending agents known from the literature, including the known two-phase mixtures, have also been investigated. In practice, any solvents and solvent mixtures can be used as suspending agents at least locally in the process of the invention, although in that case the selectivity of the process is influenced and the total water content of the system is best adapted in each case to the reaction system selected. The organic solvents used as suspending agents are normally employed in ratios by weight of from about 3 to about 25 parts of the suspending agent to 1 part by weight of cellulose. The suspending agent is preferably used in a quantity of from about 8 to about 16 parts by weight to 1 part by weight of cellulose.

To limit the water content in the reaction system, sodium hydroxide is preferably used in concentrations of at least about 50% by weight, for example in concentrations of from about 50 to about 70% by weight. Chloroacetic acid or its sodium salt can be used in anhydrous or substantially anhydrous form in anhydrous or substantially anhydrous solvent. In this connection, it may be desirable, in order to limit any rise in the water content in the reaction system, to introduce more concentrated reactants, i.e. reactants containing less water, into the alkalization and/or etherification step in subsequent reaction stages than in preceding process stages. If, for example, the first alkalization step has been carried out with 50% aqueous alkali hydroxide, the second alkalization step can be carried out with 70 to 100% alkali hydroxide in order to maintain the required limitation of the total water content in the system.

In another embodiment of the invention, the aqueous sodium hydroxide is completely or partly replaced by alcoholic sodium hydroxide to limit the water content in the reaction system. Sodium hydroxide is more soluble in methanol than in its higher homologs. Accordingly, methanolic sodium hydroxide is preferred. The solutions of sodium hydroxide monohydrate in methanol are particularly suitable and can be successfully used for the first and/or second alkalization step, with the concentration ranges specified above for aqueous alkali hydroxide solutions applying here as well.

Any of the standard, commercially available types of cellulose can be used as the cellulose starting material. Suitable celluloses are, for example, beech and spruce celluloses and also linters. The characteristic fiber length of the cellulose should not exceed about 2.0 mm after grinding. Celluloses having fiber lengths of from about 0.5 mm to about 1.2 mm are preferably used. The fiber length can of course also be shorter. Any powder-form cellulose can of course be successfully used. The optimal fiber length is determined by economic considerations. There is neither a minimum fiber length nor a minimum powder fineness. For highly substituted products and, in some cases, also for medium degrees of substitution, low molecular weight celluloses for example certain beech celluloses, are less satisfactory because of possible problems at the purification stage.

According to the invention, it is only on completion of the final process stage that the process products are purified. In this connection, it is important to bear in mind that, particularly in the case of the highly substituted carboxyalkyl celluloses having DS-values of $>1.5$ and also in the case of corresponding mixed ethers to be discussed hereinafter, only a few solvent-water mixtures can be used due to the high solubility of those products. According to the invention, these products are purified or rather washed with mixtures of ethanol and water having water contents of from about 10 to about 45%. However, it is also possible to use aqueous mixtures of isopropanol, n-propanol and acetone or mixtures of these solvents. The higher the degree of substitution, the clearer the superiority of washing with ethanol/water becomes.

Using the process of the invention, it is possible to produce products having viscosities of from about 5 to about 70,000 mPas, as measured on 2% by weight solutions at 20° C. using a Brookfield viscosimeter. Viscosity can be adjusted through the choice of the starting cellulose; by using a mixture of different polymeric celluloses; or by oxidative degradation using known procedures. However, it is important to bear in mind that the molecular weight of an anhydroglucose unit increases and, hence, the maximum attainable viscosity decreases with increasing degree of substitution. A carboxymethyl cellulose having a DS-value of approximately 1.5 has a maximum viscosity of around 25,000 mPas, for example, without the addition of crosslinking agents.

The reaction conditions for the alkalization and etherification steps can be the same as those used for such steps in the prior art, for example, in U.S. Pat. No. 3,085,087 and in German Application No. 14 18 238.

The production of mixed ethers containing carboxyalkyl groups by additional reaction with other known alkylating agents also falls within the scope of the invention. These other alkylating agents can be reacted with the cellulose or with the carboxyalkyl cellulose before, during or even after carboxyalkylation. Other standard etherifying agents which may be used are, for example, alkyl halides containing from 1 to 20 carbon atoms, epoxy alkanes, particularly 1,2-epoxy alkanes containing from 2 to 18 carbon atoms, and/or glycidol. Preferred other etherifying agents are methyl chloride, ethyl chloride, n-propyl chloride, isopropyl chloride, butyl chlorides, ethylene oxide, propylene oxide and/or glycidol. In this instance, too, the reaction conditions, i.e. in particular the reaction pressures and temperatures, can be those set forth in the prior art cited above.

Hydroxyethyl carboxymethyl celluloses (HECMC) are particularly interesting and relatively easy to produce. Hydroxyethyl carboxymethyl celluloses differ from one another in their chemical structural formula and also in their behavior in dependence upon the particular method of production selected. The monochloroacetic acid or the corresponding salt and also the second reactant, namely ethylene oxide, can be added either simultaneously or separately before or thereafter. The preferred mixed ethers of the invention have a mean degree of substitution (MS), more particularly a degree of hydroxyethyl substitution MS (HE), of from about 0.001 to about 4 and a degree of carboxymethyl substitution MS (CM) of from about 1.0 to about 2.6. The DS (CM)-value is preferably between about 1.0 and about 1.75 and the MS of the other ether groups, particularly the MS (HE), between about 0.01 and about 2.0, more preferably between about 0.01 and about 1.5, and most preferably between about 0.05 and about 1.

The reaction is preferably carried out in stirred reactors, for example in mixers, in stirrer equipped autoclaves, cascades, or in columns or screw reactors. In stirred systems, multistage stirring elements with diameter ratios of more than 0.5 times the vessel diameter should be used. In the above-mentioned reactors, the reaction can be carried out continuously or in batches.

The following observations are made to supplement and amplify the foregoing disclosure of the process of the invention:

It is of particular economic advantage to adjust a degree of substitution (DS-CM) in the range from about 1.0 to about 1.5 over several reactions and, more particularly, over a double reaction. To this end, about 75 to 100% by weight suspending agent, and preferably about 85 to about 97% by weight suspending agent is used, based on the total weight of suspending agent and water; the water content in the system preferably amounting to between about 0.7 and about 4.5 kg/kg cellulose before each etherification step and, in particular, before the final etherification step; and the molar ratio of total etherifying agent to anhydroglucose unit in each reaction stage not exceeding about 3.0, and preferably between about 0.6 and about 2.5, and more preferably between about 1.0 and about 2.2.

According to the invention, at least two reactions are used for higher degrees of substitution of the carboxy alkyl substituent (DS >1.5 and, more particularly, in the range of from about 1.5 to about 2.3).

By virtue of their particular properties, the highly substituted cellulose derivatives produced by the process of the invention are suitable for numerous applications requiring, in particular, high hydrophilicity and high water solubility of the cellulose derivatives coupled with a smooth structure of the aqueous preparations. One particular application for the cellulose derivatives having a high degree of carboxyalkyl substitution and their mixed ethers produced in accordance with the invention is as an auxiliary in oil drilling operations and, more particularly, as a thickener and fluid loss reducer as defined in the relevant OCMA specifications (OCMA = Oil Companies Materials Association, Cecil Chambers, 86 Strand, London WC 2).

The use of the products produced by the process of the invention as oil drilling auxiliaries is another aspect of the present invention.

The following Examples describe the production of clearly soluble, highly substituted carboxyalkyl celluloses and mixed ethers thereof, and are given for illustration purposes only and not to limit the invention.

EXAMPLES

The viscosity given in all the following Examples was determined on a 2% by weight aqueous solution at 23° C. using a Brookfield viscosimeter; the cellulose ether being assumed to have a moisture content of 5%. The cloud index was measured in cuvettes with a layer thickness of 3.5 cm using a measuring apparatus of the type manufactured by the Lange Company of Berlin.

Pine cellulose predominantly in powder form with 95% of the particles smaller than 100 u and in the form of fibers 0.5 mm and 1.1 mm long and having a moisture content of approximately 4% (water) was suspended with vigorous stirring in a solvent at room temperature. The sodium hydroxide solution was added dropwise over a period of about 5 minutes. The monochloroacetic acid solution was then added with cooling. After gradual heating to 50° C., the reaction was carried out for 20 minutes at 50° C. to 60° C. and then for 80 minutes at 70° C. After cooling to about 30° C., the next reaction was carried out, or, alternatively, the reaction mixture was worked up after neutralization of the very small excess of alkali hydroxide. Washing was carried out with 55 to 80% isopropanol (IPA) or with ethanol, depending on the degree of substitution of the product. After the product had been dried in vacuo, the following products were synthesized. The quantities of reactants and solvents are also given below:

1. Quantities used: 70 g of cellulose, 86.5 g of 50% sodium hydroxide solution for the first reaction and another 86.5 g for the second reaction, 102 g of 50% anhydrous monochloroacetic acid for the first reaction and another 102 g for the second reaction, 1.1 g of methyl chloride, 0.91 g of ethylene oxide; solvents: 841 g of IPA, 111 g of water.

Product: degrees of substitution DS (CM) =1.51, DS (ME =methyl) =0.03, MS (HE) =0.02, viscosity 3100 mPas, cloud index 2.

2. Quantities used: 70 g of cellulose, 83.3 g of 50% sodium hydroxide solution for the first reaction and another 62.8 g for the second reaction, 64 g of 80% monochloroacetic acid for the first reaction and another 44.1 g for the second reaction, 1.8 g of methyl chloride; solvent: n-butanol (100%).

Product: degrees of substitution DS (CM) =1.45, DS (ME) =0.05, viscosity 1400 mPas, cloud index 4.

3. Quantities used: 70 g of cellulose, 132 g of 50% sodium hydroxide solution for the first reaction and another 132 g for the second reaction, 156 g of 50% anhydrous monochloroacetic acid for the first reaction and another 156 g for the second reaction; solvent: 890 g of IPA, 47 g of water.

Product: degree of substitution 1.65, selectivity 41%, viscosity 150 mPas, cloud index 1.

4. Quantities used: as in Example 3; solvent: 972 g of IPA (100%).

Product: degree of substitution 2.04, selectivity 51%, viscosity 230 mPas, cloud index 1.5.

5. Quantities used: as in Example 3; solvent: n-butanol (100%).

Product: degree of substitution 2.20, selectivity 55%, viscosity 1700 mPas, cloud index 5.

6. Quantities used: 70 g of cellulose 1st reaction: 132 g of 50% sodium hydroxide solution, 2nd reaction: 95 g of 70% sodium hydroxide solution, 3rd reaction: 66 g of 100% caustic soda and 156 g of 50% anhydrous monochloroacetic acid for each of the three reactions; solvent: 770 g of n-butanol (100%).

Product: degree of substitution 2.35, selectivity 39%, viscosity 170 mPas, cloud index <1.

7. Quantities used: 60 kg of cellulose, 87 kg and 61 kg, respectively, of 50% sodium hydroxide solution and 54.6 kg and 37.8 kg, respectively, of 80% monochloroacetic acid for the first and second reactions; solvent: 900 kg of 87% IPA (isopropanol).

Product: degree of substitution 1.48, selectivity 67%, viscosity 4100 mPas, cloud index 5.5, gel content <0.5%.

8. Quantities used: 70 kg of cellulose, 134 kg of 50% sodium hydroxide solution for the first reaction and 67 kg of caustic soda for the second reaction, 78.4 kg of 50% anhydrous monochloroacetic acid for the first reaction and another 78.4 kg for the second reaction; solvent: 1018 kg of IPA (100%).

Product: degree of substitution 1.99, selectivity 50%, viscosity 1300 mPas, cloud index 9, gel content <0.5%.

What is claimed is:

1. A process for the preparation of a highly substituted carboxyalkyl cellulose having an average degree of substitution of from about 1.0 to about 2.8, and optionally mixed ethers thereof having a mean overall degree of substitution of greater than 1, comprising two or three reaction stages wherein each reaction stage is carried out by treating a suspension of finely divided cellulose in an organic suspending agent with no greater than about 5 moles, per mole of anhydroglucose unit present in the cellulose, of an alkalizing agent, followed by etherification of the alkalized product with no greater than about 2.5 moles, per mole of anhydroglucose unit, of a carboxyalkylating agent, optionally accompanied, preceded, or followed by reaction with at least one additional etherifying agent, wherein each successive reaction stage is carried out on the reaction mixture of the preceding reaction stage without intermediate purification of the reaction product contained therein, and wherein the total water content of the system prior to the last treatment with a carboxyalkylating agent is no greater than about 450% by weight, based on the weight of finely divided cellulose initially used in the process.

2. A process in accordance with claim 1 wherein each stage of the process is carried out at a temperature of from about 10 to about 110° C., provided that the initial treatment with an alkalizing agent is carried out at a temperature in the range of from about 10 to about 30° C.

3. A process in accordance with claim 1 wherein the quantity of carboxyalkylating agent used in each reaction stage is no greater than about 2.2 moles per mole of anhydroglucose unit.

4. A process in accordance with claim 3 wherein the quantity of carboxyalkylating agent is in the range of from about 1.0 to about 2.2 moles per mole of anhydroglucose unit.

5. A process in accordance with claim 1 wherein the quantity of alkalizing agent used in each stage is no greater than about 4 moles per mole of anhydroglucose unit.

6. A process in accordance with claim 5 wherein said quantity of alkalizing agent is in the range of from about 2 to about 4 moles per mole of anhydroglucose unit.

7. A process in accordance with claim 1 wherein in each reaction stage successively smaller quantities of etherifying agent and alkalizing agent are employed compared to those employed in the immediately preceding reaction stage.

8. A process in accordance with claim 1 wherein the total water content of the system before the last treatment with the carboxyalkylating agent is from about 80 to about 250% by weight, based on the weight of finely divided cellulose initially used in the process.

9. A process in accordance with claim 1 wherein the organic suspending agent is at least one aliphatic alcohol containing from 2 to 5 carbon atoms.

10. A process in accordance with claim 2 wherein each stage of the process other than the initial treatment with an alkalizing agent is carried out at a temperature in the range of from about 40° to about 85° C.

11. A process in accordance with claim 1 wherein the quantities of the reactants and composition of the reaction mixture in each stage is adjusted to produce a product having a DS carboxyalkylation value of from about 1.8 to about 2.6.

12. A process in accordance with claim 11 wherein the DS carboxyalkylation value is from about 2.0 to about 2.5.

13. A process in accordance with claim 1 wherein the alkalizing agent is an alkali metal hydroxide containing no more than 5% by weight of water, methanol, or aqueous methanol.

14. A process in accordance with claim 1 wherein in each reaction stage the carboxyalkylating agent is chloroacetic acid and the alkalizing agent is sodium hydroxide.

15. A process in accordance with claim 1 wherein the finely divided cellulose has fiber lengths not in excess of 2 mm.

16. A process in accordance with claim 1 wherein the optional additional etherifying agent is at least one compound selected from the group consisting of an alkyl halide having from 1 to 20 carbon atoms, an epoxy alkane, and glycidol, and wherein the degree of substitution MS for such additional etherifying agent is in the range of from about 0.01 to about 2.

17. A process in accordance with claim 16 wherein the degree of substitution MS is in the range of from about 0.01 to about 1.5.

18. A process in accordance with claim 17 wherein the degree of substitution MS is in the range of from about 0.05 to about 1.

19. A process in accordance with claim 1 wherein the weight ratio of organic suspending agent to finely divided cellulose is in the range of from about 3:1 to about 25:1.

20. A process in accordance with claim 19 wherein said weight ratio of organic suspending agent to cellulose is in the range of from about 8:1 to about 16:1.

21. A process in accordance with claim 1 wherein the carboxyalkylating agent is a carboxymethylating agent and the product produced by the process is a hydroxyethyl carboxymethyl cellulose having a degree of carboxymethylation of from about 1.0 to about 2.6 and a degree of hydroxyethylation of from about 0.001 to about 4.

22. A process in accordance with claim 1 wherein during the course of the process some of the water of reaction formed by the process is removed in the form of an azeotrope with the organic suspending agent.

* * * * *